US010700572B2

(12) United States Patent
Weber et al.

(10) Patent No.: US 10,700,572 B2
(45) Date of Patent: Jun. 30, 2020

(54) ELECTRIC MACHINE

(71) Applicant: AUDI AG, Ingolstadt (DE)

(72) Inventors: Korbinian Weber, Ingolstadt (DE); Peter Juris, Ingolstadt (DE); Florian Stadler, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 93 days.

(21) Appl. No.: 16/103,093

(22) Filed: Aug. 14, 2018

(65) Prior Publication Data
US 2019/0123612 A1 Apr. 25, 2019

(30) Foreign Application Priority Data
Oct. 23, 2017 (DE) .................. 10 2017 218 828

(51) Int. Cl.
H02K 5/20 (2006.01)
H02K 1/20 (2006.01)
H02K 9/19 (2006.01)
H02K 9/12 (2006.01)
(Continued)

(52) U.S. Cl.
CPC ............. H02K 5/20 (2013.01); H02K 1/20 (2013.01); H02K 3/24 (2013.01); H02K 9/04 (2013.01); H02K 9/12 (2013.01); H02K 9/19 (2013.01); H02K 2209/00 (2013.01)

(58) Field of Classification Search
CPC .. H02K 1/20; H02K 3/24; H02K 5/20; H02K 9/14; H02K 9/16
See application file for complete search history.

(56) References Cited

U.S. PATENT DOCUMENTS 2,975,309 A * 3/1961 Seidner ............... H02K 9/197
310/54
6,522,036 B1 2/2003 Chen
(Continued)

FOREIGN PATENT DOCUMENTS

AT 412 311 B 12/2004
DE 1 010 625 A 6/1957
(Continued)

OTHER PUBLICATIONS

Examination Report dated Jul. 6, 2018 of corresponding German application No. 10 2017 218 828.6; 6 pgs.
(Continued)

Primary Examiner — Burton S Mullins
(74) Attorney, Agent, or Firm — Maier & Maier, PLLC

(57) ABSTRACT

An electric machine having a stator arranged in a machine housing and a rotor mounted rotatably relative to the stator about an axis of rotation, wherein the machine housing includes at least one coolant inlet port for supplying coolant to the machine housing and at least one coolant outlet port for draining coolant from the machine housing. It is provided that the coolant inlet port empties into a distribution annulus and several housing coolant ducts emerge from the distribution annulus and extend beyond the stator, when viewed in the axial direction, and are connected fluidically, on their side facing away from the distribution annulus, to stator cooling duct inlets of stator cooling ducts formed in the stator, which pass entirely through the stator in the axial direction.

9 Claims, 2 Drawing Sheets

(51) Int. Cl.
*H02K 3/24* (2006.01)
*H02K 9/04* (2006.01)

(56) References Cited

U.S. PATENT DOCUMENTS

| | | | |
|---|---|---|---|
| 8,487,489 B2* | 7/2013 | Palafox | H02K 3/24 |
| | | | 310/52 |
| 8,970,073 B2* | 3/2015 | Miyamoto | H02K 9/19 |
| | | | 310/54 |
| 9,225,224 B2 | 12/2015 | Memminger et al. | |
| 10,097,066 B2* | 10/2018 | Hanumalagutti | H02K 1/20 |
| 10,141,798 B2 | 11/2018 | Rogginger et al. | |
| 2005/0206252 A1* | 9/2005 | Georg | H02K 5/20 |
| | | | 310/59 |
| 2012/0025638 A1 | 2/2012 | Palafox et al. | |
| 2017/0271955 A1 | 9/2017 | Hanumalagutti et al. | |

FOREIGN PATENT DOCUMENTS

| | | |
|---|---|---|
| DE | 103 35 141 A1 | 3/2005 |
| EP | 3 054 565 A1 | 8/2016 |
| EP | 3 079 229 A1 | 10/2016 |
| FR | 1 349 625 A | 1/1964 |
| JP | 2004-112968 A | 4/2004 |
| WO | 03/084028 A1 | 10/2003 |
| WO | 2016/113034 A1 | 7/2016 |
| WO | 2016/132060 A1 | 8/2016 |

OTHER PUBLICATIONS

Search Report dated Jan. 29, 2019 in corresponding European Application No. 18185798; 9 pages with partial machine-generated English-language translation.

* cited by examiner

ELECTRIC MACHINE

FIELD

The invention relates to an electric machine with a stator arranged in a machine housing and a rotor mounted rotatably in regard to the stator about an axis of rotation, wherein the machine housing comprises at least one coolant inlet port for supplying of coolant to the machine housing and at least one coolant outlet port for draining of coolant from the machine housing.

BACKGROUND

The electric machine serves for transforming electrical energy into kinetic energy or vice versa. In the former case, the electric machine is operated as a motor, in the latter case as a generator. The electric machine is present, for example, in the form of a traction machine of a motor vehicle. Accordingly, it serves for the propulsion of the motor vehicle, i.e., the providing of a torque directed at driving the motor vehicle. The electric machine comprises the stator and the rotor, which are arranged in the machine housing. The rotor is mounted and can rotate relative to the stator about the axis of rotation.

Heat accrues during the operation of the electric machine and this must be discharged by means of a coolant, especially in electric machines with high power density. For this reason, the machine housing comprises the coolant inlet port and the coolant outlet port. Through the coolant inlet port, coolant can be supplied to the machine housing. Through the coolant outlet port, on the other hand, the coolant can be drained from the machine housing.

In the prior art, the document EP 3 054 565 A1 is known, for example. This relates to a cooling arrangement for the cooling of stator windings of a generator stator arranged in a generator housing, said stator having a plurality of axial cooling ducts, wherein an axial cooling duct extends between windings that are arranged on adjacent stator teeth. Furthermore, a cover device is provided in order to separate the axial cooling ducts from an air gap of the generator, wherein an axial cover of the cover device comprises at least one inlet opening, which connects the air gap to an axial cooling duct. Finally, a flow device is provided to bring a gaseous coolant flow into the air gap and the axial cooling ducts.

SUMMARY

The object of the invention is to propose an electric machine that has advantages when compared with known electric machines, especially a particularly effective cooling.

In this case, it is proposed that the coolant inlet port empties into a distribution annulus and several housing coolant ducts emerge from the distribution annulus and extend beyond the stator, when viewed in the axial direction, and are connected fluidically, on their side facing away from the distribution annulus, to stator cooling duct inlets of stator cooling ducts formed in the stator, which pass entirely through the stator in the axial direction and are connected on their side facing away from the stator cooling duct inlets to the coolant outlet port by way of stator cooling duct outlets.

The coolant supplied through the coolant inlet port at first flows into the distribution annulus and is distributed by the latter among several housing coolant ducts. The housing coolant ducts extend, when viewed in the axial direction, from the distribution annulus by way of the stator, i.e., engaging over an axial end of the stator. Next, the coolant goes through the stator cooling duct inlets into the stator cooling ducts, flows through them in the axial direction, and then emerges through the stator cooling duct outlets in the direction of the coolant outlet port from the stator cooling ducts. The stator cooling ducts extend in the axial direction throughout the entire stator, i.e., they pass entirely through it in the axial direction.

The cooling of the electric machine accomplished in this way ensures both a cooling of the machine housing by the flow through the housing coolant ducts, which are in a heat transfer connection with the machine housing or are formed on or in the machine housing, as well as a cooling of the stator. For this purpose, the stator cooling ducts are in heat transfer connection with the stator or are formed on or in the latter.

In order to accomplish an especially effective cooling, the housing coolant ducts extend in the axial direction from the distribution annulus beyond the stator, so that the coolant flowing through the stator cooling ducts can then flow entirely through the stator in the axial direction. The overlapping region of the housing coolant ducts in the longitudinal cross section, relative to the length of the stator in the axial direction, is at least 0.5, at least 0.6, at least 0.7, at least 0.75, at least 0.8 or at least 0.9. In other words, the housing coolant ducts engage around the stator for the most part, while the stator cooling ducts extend entirely through the stator in the axial direction.

The housing coolant ducts preferably run straight for the most part or even entirely, especially exactly in the axial direction. This likewise preferably applies to the stator cooling ducts. The coolant at first flows through the housing coolant ducts in a first axial direction, then is deflected and flows through the stator cooling ducts in a second axial direction, which is opposite to the first axial direction. Accordingly, the coolant flows in opposite directions through the machine housing.

Preferably, when viewed in the longitudinal cross section, the coolant outlet port lies on the side of the coolant inlet port facing away from the stator cooling duct inlets. For example, the coolant inlet port is overlapped with the stator in the axial direction, whereas the coolant outlet port is arranged at a distance from the stator in the axial direction. With such a configuration of the electric machine, an especially efficient heat transfer is accomplished between the machine housing and the stator, on the one hand, and the coolant, on the other hand, so that even at high power densities of the electric machine, the heat created during the operation of the electric machine can be discharged effectively.

The provision of the distribution annulus has the advantage that the coolant is divided up evenly or at least almost evenly among the housing coolant ducts. For example, the housing coolant ducts have different flow resistances for this purpose, which are established as a function of the flow path length between the coolant inlet port and the respective housing cooling duct. Accordingly, a hydraulic equalization is achieved for the electric machine, so that a uniform cooling of the machine housing is accomplished, and hence the occurrence of thermal stresses in the latter is minimized.

Another embodiment of the invention proposes that the distribution annulus is formed in a housing wall of the machine housing or is bounded by the housing wall, and/or the housing coolant ducts are formed in the housing wall or are bounded by the housing wall. In the longitudinal cross section, the distribution annulus or the housing coolant ducts may be bounded in the radial direction both on the inside and on the outside by the housing wall, so that they are formed entirely in the housing wall.

Alternatively, it is possible, of course, to form the distribution annulus or the housing coolant ducts only partly with the use of the housing wall. For example, they are present in the form of recesses in the housing wall, which are closed by an outer peripheral surface of the stator. In this case, the distribution annulus or the housing coolant ducts are formed between the housing wall and the stator or the outer periphery of the stator, when viewed in the radial direction. Likewise, it can be provided, of course, that the distribution annulus or the housing coolant ducts are formed as recesses in the stator, which are closed by an inner peripheral surface of the housing wall. Also in this case, they are formed jointly by the housing wall and the stator.

An enhancement of the invention provides that the distribution annulus is formed continuous in the peripheral direction and the housing coolant ducts emerge from the distribution annulus, distributed evenly about the periphery of the housing. The distribution annulus accordingly embraces the rotor entirely in the peripheral direction. This has the benefit that an especially uniform distribution of the coolant among the housing coolant ducts is achieved. The housing coolant ducts themselves are arranged evenly distributed over the periphery of the machine housing, so that a uniform cooling of the machine housing is realized.

Another especially preferred embodiment of the invention provides that the housing coolant ducts empty into a collecting space on their side facing away from the distribution annulus, from which the stator cooling ducts emerge, or each of the housing coolant ducts is joined fluidically, separately from the other housing coolant ducts, to one of the stator cooling ducts. Basically, two different configurations of the electric machine can be distinguished.

In a first embodiment, after exiting from the housing coolant ducts, the coolant is at first gathered in the collecting space and only then distributed among the stator cooling ducts. The collecting space in this case serves for a homogenizing of the coolant, so that any existing temperature differences between the coolant flowing through the different housing coolant ducts are equalized.

Alternatively, in a second embodiment it may be provided that the housing coolant ducts are fluidically connected to the stator cooling ducts separately from each other. For example, therefore, exactly one of the housing coolant ducts is fluidically connected to exactly one of the stator cooling ducts. Of course, several stator cooling ducts may also be connected to each of the housing coolant ducts or, on the other hand, several housing coolant ducts may be connected to each of the stator cooling ducts. In any case, however, this is realized fluidically separate from the other respective housing coolant ducts.

Another preferred embodiment of the invention proposes that the housing coolant ducts are bounded jointly by the housing wall and an outer periphery of the stator. This has already been pointed out above. Such an embodiment has the benefit that the housing coolant ducts can be manufactured easily and economically, since the housing coolant ducts are present only as a recess in the housing wall and/or the stator. The housing coolant ducts in this case are formed only when the stator is mounted in the machine housing and are then bounded jointly by the housing wall and the stator.

One enhancement of the invention provides that the distribution annulus is arranged overlapping with the stator, when viewed in the axial direction. Thus, the coolant is supplied in a region of the electric machine or of the machine housing that lies in the region of the stator—when viewed in the longitudinal cross section. The coolant present in the distribution annulus in this case already serves for a cooling of the electric machine, namely, the machine housing in particular, but also the stator, which lies against the machine housing preferably so as to transfer heat.

Preferably, the distribution annulus has a significantly larger flow cross section than the coolant inlet port and the housing coolant ducts. Accordingly, the flow velocity of the coolant in the distribution annulus is relatively low, so that turbulence that might increase the flow resistance is avoided or at least largely avoided. In particular, a low-loss flowing of the coolant into the housing coolant ducts is realized.

Another embodiment of the invention provides that the coolant outlet port is present on the side of the stator facing away from the stator cooling duct inlets, when viewed in the axial direction. Thus, the coolant, already heated by flowing through the housing coolant ducts and the stator cooling ducts, is at first carried onward by the stator before it is discharged from the machine housing. This effectively avoids any impairment of the cooling action. Furthermore, the described arrangement of the coolant outlet port makes possible a complete flow of coolant through the stator, so that an especially effective cooling is produced.

Another preferred embodiment of the invention provides that the stator cooling ducts are arranged between stator teeth of the stator. The stator teeth extend from an inner periphery of the stator in the radial direction inwardly in the direction of the rotor. On the stator teeth are arranged the windings or winding turns of electric coils that serve for generating a magnetic field in the electric machine. The stator cooling ducts are present in the peripheral direction between the stator teeth of the stator. For example, the stator cooling ducts are bounded, at least in regions, by the stator teeth in the peripheral direction.

Another embodiment of the invention proposes that the stator cooling ducts are present between adjacent stator windings of the stator or are formed in the stator windings. The stator windings engage around the teeth of the stator or are present between the stator teeth, at least when viewed in the peripheral direction. Preferably, the stator cooling ducts are bounded, at least in regions, by the stator windings. For this, they are present between adjacent stator windings or are formed in the stator windings. In this regard, a direct cooling also of the stator windings can be produced by the coolant.

Finally, it may be provided in the scope of another preferred embodiment of the invention that the stator cooling ducts formed in the stator windings are present as recesses open at the edge in winding plates of the stator windings, so that adjacent winding plates jointly bound at least one of the stator cooling ducts each time, when viewed in the cross section. The stator windings are composed of the winding plates, which are arranged in layers relative to each other.

Recesses open at the edge are now formed in the winding plates, each time being overlapped by an adjacently arranged winding plate. In this regard, the adjacent winding plates jointly bound the at least one of the stator cooling ducts, when viewed in cross section. This enables, on the one hand, an especially advantageous guidance of the coolant and, on the other hand, heat is very effectively discharged from the stator windings.

BRIEF DESCRIPTION OF THE DRAWINGS

The invention shall now be explained more closely with the aid of the exemplary embodiments represented in the drawing, without this limiting the invention. Herein are shown.

DETAILED DESCRIPTION

Figure 1:
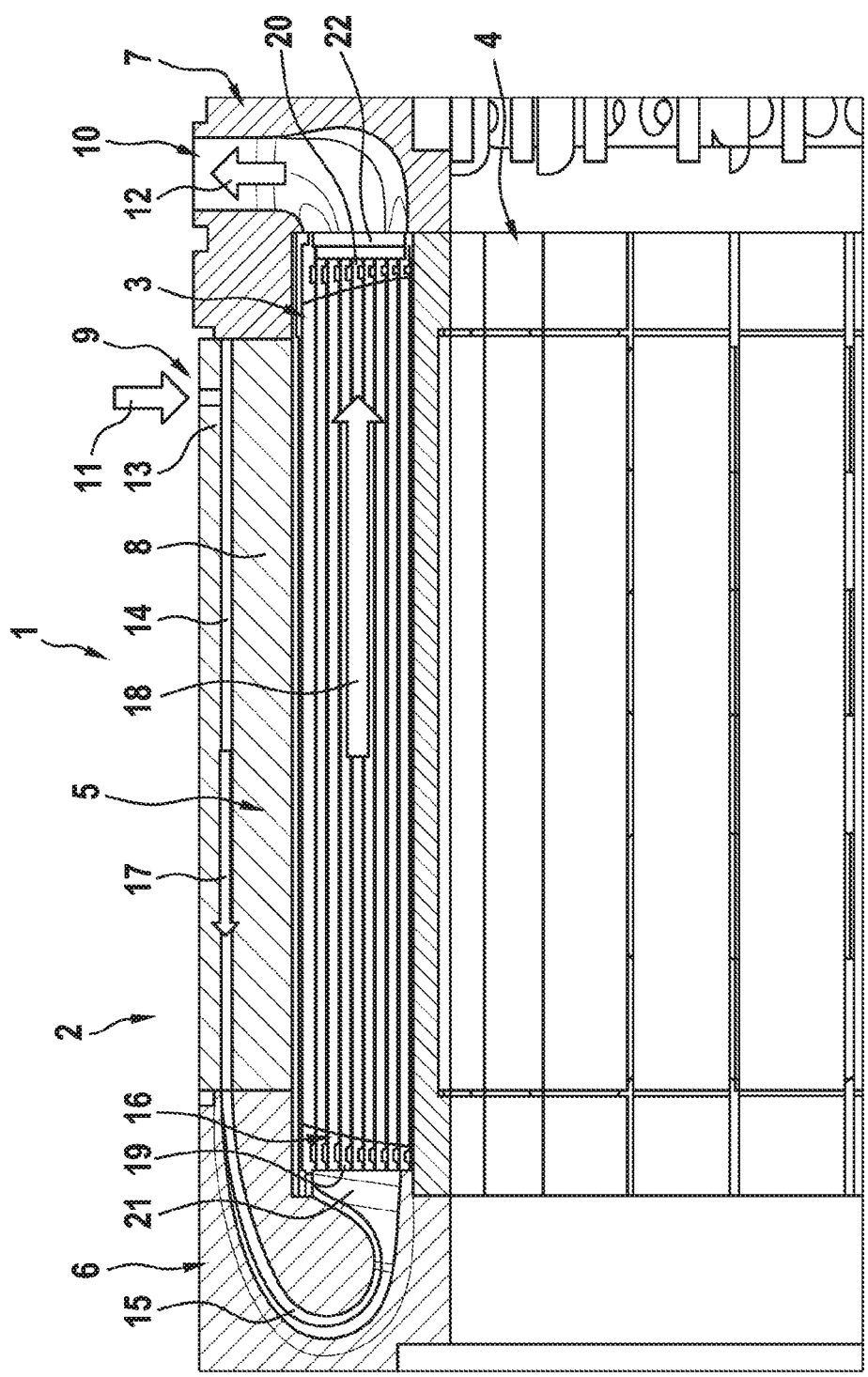
FIG. 1 a schematic representation of an electric machine in longitudinal section.

FIG. 1 shows a longitudinal sectional representation through an electric machine 1, comprising a machine housing 2, a stator 3 disposed fixed in place in the machine housing 2 and a rotor 4 mounted so as to rotate with respect to the stator 3 about an axis of rotation. The machine housing 2 in the exemplary embodiment represented here has a first housing element 5, a second housing element 6, as well as a third housing element 7. The first housing element 5 is arranged in the axial direction between the housing elements 6 and 7. For example, the housing elements 6 and 7 serve as a support for the stator 3 in the axial direction and/or in the radial direction. The machine housing 2 comprises a housing wall 8, which extends across the three housing elements 5, 6 and 7. Each of these housing elements 5, 6 and 7 accordingly forms at least a portion of the housing wall 8.

For cooling the electric machine 1 there are formed a coolant inlet port 9 and a coolant outlet port 10 on the machine housing 2. The coolant inlet port 9 serves for supplying coolant into the machine housing 2 and the coolant outlet port 10 serves for draining coolant from the machine housing 2. The supplying of the coolant is indicated by the arrow 11, the draining by the arrow 12. The coolant inlet port 9 empties into a distribution annulus 13, which completely encloses the stator 3 in the peripheral direction. Several housing coolant ducts 14 emerge from the distribution annulus 13, extending beyond an axial end of the stator 3, which is situated further from the distribution annulus 13 in the axial direction than is the other respective axial end.

The housing coolant ducts 14 empty into deflection ducts 15, in which the flow direction is diverted by 180°, when viewed in the axial direction. From the deflection ducts 15 the coolant arrives in stator cooling ducts 16. Thanks to the deflecting of the coolant, the coolant flows from the distribution annulus 13 according to the arrow 17 through the housing coolant ducts 14 and then in the opposite direction according to the arrow 19 through the stator cooling ducts 16. The coolant enters the stator cooling ducts 16 through stator cooling duct inlets 19 and exits from them through stator cooling duct outlets 20 at the opposite end in the axial direction.

Fluidically, a collecting space 21 may be present between the housing cooling duct 14 and the stator cooling duct 16, especially between the deflection duct 15 and the stator cooling duct 16, in which the coolant of several or all housing coolant ducts 14 is at first brought together and only after this is supplied to the stator cooling ducts 16. Downstream of the stator cooling ducts 16, the latter are connected fluidically by the stator cooling duct outlets 20 to the coolant outlet 10. For this purpose, the stator cooling ducts 16 empty, for example, into a collecting annulus 22, by way of which all stator cooling ducts 16 are in flow connection with the stator cooling duct outlet 20.

Figure 2:
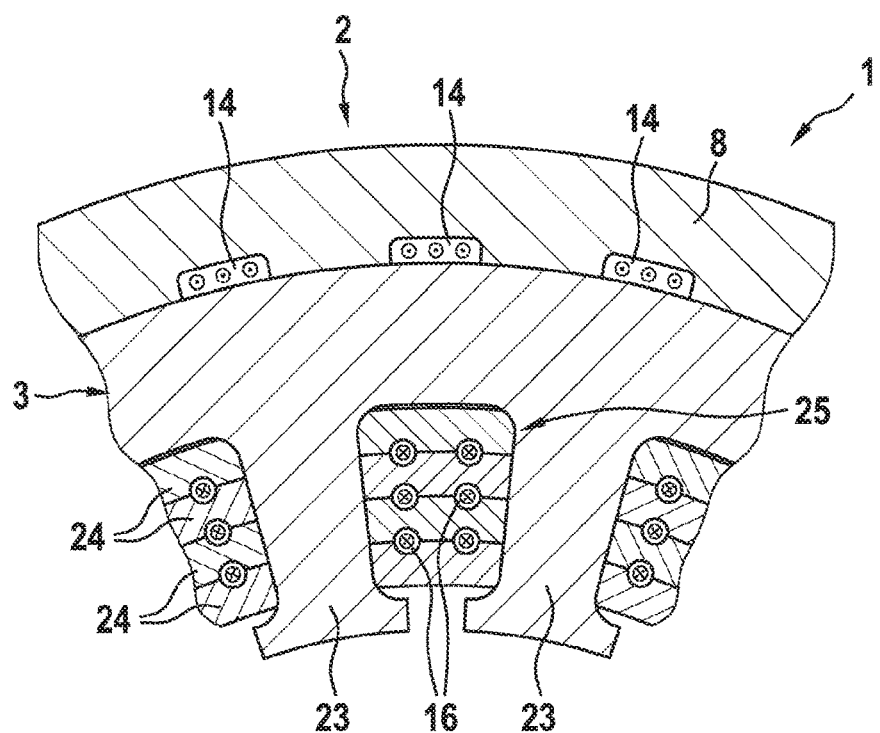
FIG. 2 a schematic partial cross-sectional representation of the electric machine in a first embodiment.

FIG. 2 shows a partial cross-sectional representation of the electric machine 1 in a first embodiment. It can be seen that the housing coolant ducts 14 are formed as recesses in the housing wall 8 and are closed by the stator 3. The housing coolant ducts 14 are accordingly formed jointly by the housing wall 8 and the stator 3. Furthermore, it can be seen that the stator cooling ducts 16 are arranged between stator teeth 23 of the stator 3. They are present between winding plates 24 of a winding 25. The stator cooling ducts 16 are fashioned as recesses open at the edge in the winding plates 24, so that adjacent winding plates 24 each time jointly bound at least one of the stator cooling ducts 16.

Figure 3:
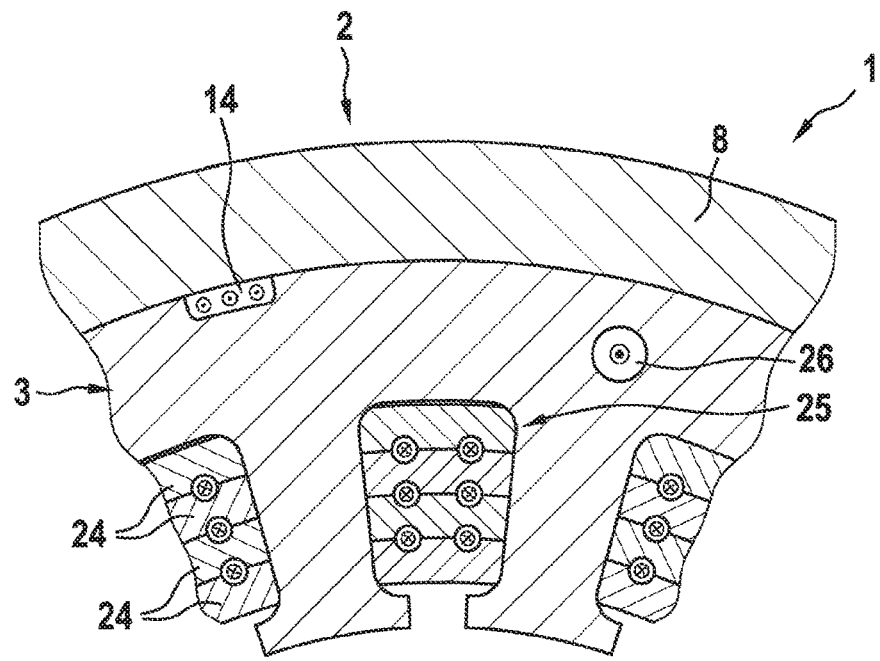
FIG. 3 a schematic partial cross-sectional representation of the electric machine in a second embodiment.

FIG. 3 shows a partial cross-sectional representation of the electric machine 1. The second embodiment corresponds substantially to the first embodiment, so that reference is made to the above remarks and only the differences shall be discussed below. These differences lie in the fact that the housing coolant ducts 14 are formed as a recess open at the edge in the stator 3, being closed by the housing wall 8. In addition, another housing cooling duct 26 may be provided, which is present entirely in the stator 3, i.e., it is formed in the latter and closed at the edge in cross section. With such a configuration of the housing cooling duct 26, the stator 3 is connected so as to transfer heat to the machine housing 2 or the housing wall 8, so that an effective cooling of the machine housing 2 is assured.

The described configuration of the electric machine 1 enables an especially effective cooling of both the machine housing 2 and the stator 3. In particular, it is provided that the housing coolant ducts 14 emerging from the distribution annulus 13 have different flow resistances, depending on the fluidic distance of the respective housing cooling duct 14 from the coolant inlet port 9. Accordingly, a hydraulic equalization can be realized between the housing coolant ducts 14, so that for a given mass flow, these ducts are provided with the same coolant mass flow through the coolant inlet port 9 each time. This results in an especially uniform cooling of the machine housing 2, avoiding thermal stresses.

The invention claimed is:

1. An electric machine comprising:
a stator arranged in a machine housing and a rotor mounted rotatably relative to the stator about an axis of rotation, wherein the machine housing comprises at least one coolant inlet port for supplying coolant to the machine housing and at least one coolant outlet port for draining coolant from the machine housing, hereby characterized in that the coolant inlet port empties into a distribution annulus, and several housing coolant ducts emerge from the distribution annulus and extend beyond the stator, when viewed in the axial direction, and are connected fluidically, on their side facing away from the distribution annulus, to stator cooling duct inlets of stator cooling ducts formed in the stator, which pass entirely through the stator in the axial direction and are connected, on their side facing away from the stator cooling duct inlets, to the coolant outlet port by way of stator cooling duct outlets,
wherein the coolant outlet port is present on the side of the stator facing away from the stator cooling duct inlets, when viewed in the axial direction.

2. The electric machine as claimed in claim 1, wherein in that the distribution annulus is formed in a housing wall of the machine housing or is bounded by the housing wall, and/or in that the housing coolant ducts are formed in the housing wall or are bounded by the housing wall.

3. The electric machine as claimed in claim 1, wherein the distribution annulus is formed continuous in the peripheral direction, and the housing coolant ducts emerge from the distribution annulus, distributed evenly over the periphery of the housing.

4. The electric machine as claimed in claim 1, wherein on their side facing away from the distribution annulus, the housing coolant ducts empty into a collecting space from which the stator cooling ducts emerge, or in that each of the housing coolant ducts is joined fluidically to one of the stator cooling ducts, separately from the other housing coolant ducts.

5. The electric machine as claimed in claim 1, wherein the housing coolant ducts are bounded jointly by the housing wall and an outer periphery of the stator.

6. The electric machine as claimed in claim 1, wherein the distribution annulus is arranged overlapping with the stator, when viewed in the axial direction.

7. The electric machine as claimed in claim 1, wherein the stator cooling ducts are arranged between stator teeth of the stator.

8. The electric machine as claimed in claim 1, wherein the stator cooling ducts are present between adjacent windings of the stator or are formed in the stator windings.

9. The electric machine as claimed in claim 1, wherein the stator cooling ducts are formed in the stator windings and are present as recesses open at the edge in winding plates of the stator windings, so that adjacent winding plates jointly bound at least one of the stator cooling ducts each time, when viewed in the cross section.

* * * * *